(12) United States Patent
Jung et al.

(10) Patent No.: US 7,993,723 B2
(45) Date of Patent: Aug. 9, 2011

(54) VACUUM INSULATION PANEL AND INSULATION STRUCTURE OF REFRIGERATOR APPLYING THE SAME

(75) Inventors: Dong-Ju Jung, Gyeongsangnam-Do (KR); Young-Bae Kim, Busan (KR); Kyung-Do Kim, Busan (KR); Sang-Eui Hong, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 205 days.

(21) Appl. No.: 12/090,473

(22) PCT Filed: Oct. 17, 2006

(86) PCT No.: PCT/KR2006/004203
§ 371 (c)(1),
(2), (4) Date: Apr. 16, 2008

(87) PCT Pub. No.: WO2007/046614
PCT Pub. Date: Apr. 26, 2007

(65) Prior Publication Data
US 2008/0286515 A1    Nov. 20, 2008

(30) Foreign Application Priority Data

| Oct. 18, 2005 | (KR) | 10-2005-0098296 |
| Nov. 16, 2005 | (KR) | 10-2005-0109870 |
| Nov. 16, 2005 | (KR) | 10-2005-0109871 |
| Nov. 22, 2005 | (KR) | 10-2005-0112013 |

(51) Int. Cl.
*F16L 59/065* (2006.01)
(52) U.S. Cl. .......................... 428/69; 213/406

(58) Field of Classification Search ............... 428/69; 312/406
See application file for complete search history.

(56) References Cited

U.S. PATENT DOCUMENTS
4,669,632 A * 6/1987 Kawasaki et al. ............. 428/172
(Continued)

FOREIGN PATENT DOCUMENTS
CN    1659402 A    8/2005
(Continued)

OTHER PUBLICATIONS
Production of Commercial Aluminum Plate, Strip and Foil; Dengxuan; 1992; pp. 14-15 and 20-22; Metallurgical Industry Press.

*Primary Examiner* — Alexander Thomas
(74) *Attorney, Agent, or Firm* — Birch, Stewart, Kolasch & Birch, LLP

(57) ABSTRACT

A vacuum insulation panel and an insulation structure of a refrigerator applying the same are disclosed. The vacuum insulation panel comprises: a sealing cover (120) having an outermost layer exposed to the outside, a gas shielding layer stacked on the bottom surface of the outermost layer and formed of a thin metal sheet and a metal deposition film, and a heating-fusion bonding layer stacked on the bottom surface of the gas shielding layer and formed of an octane-base material; a core material (110) sealed by the sealing cover (120) in contact with the heating-fusion bonding layer, and provided with an extended insulation portion (130) some parts of which are extended between the bonding portions formed at the sealing cover (120); and a gas permeation preventing layer (125) formed on the sealing cover (120), so that can prevent an external air or moisture from penetrating into a vacuum insulation panel.

7 Claims, 13 Drawing Sheets

U.S. PATENT DOCUMENTS

| | | | |
|---|---|---|---|
| 2002/0172794 A1* | 11/2002 | Tokonabe et al. | 428/69 |
| 2003/0008100 A1* | 1/2003 | Horn | 428/69 |
| 2006/0088685 A1* | 4/2006 | Echigoya et al. | 428/69 |

FOREIGN PATENT DOCUMENTS

| | | |
|---|---|---|
| DE | 19758219 A1 | 7/1999 |
| EP | 1258343 A2 | 11/2002 |
| EP | 1510747 A1 | 3/2005 |
| JP | 5-302696 A | 11/1993 |
| JP | 2005-126685 A | 5/2005 |

* cited by examiner

VACUUM INSULATION PANEL AND INSULATION STRUCTURE OF REFRIGERATOR APPLYING THE SAME

RELATED APPLICATION

The present disclosure relates to subject matter contained in priority Korean Applications No. 10-2005-0098296, filed on Oct. 18, 2005, No. 10-2005-0109870, filed on Nov. 16, 2005, No. 10-2005-0109871, filed on Nov. 16, 2005, and No. 10-2005-0112013, filed on Nov. 22, 2005.

TECHNICAL FIELD

The present invention relates to a vacuum insulation panel, and more particularly, to a vacuum insulation panel, which can prevent a sealing cover from being damaged by enhancing strength and improve ability of vacuum insulation by means of preventing a pin hole from being generated at a bonding portion of a sealing cover and decrease thermal loss by selecting a proper thickness and material of a gas shielding layer.

BACKGROUND ART

As shown in FIG. 1, generally, a refrigerator 1 is an apparatus for storing food at a low temperature, and comprises a cabinet 10 constituting storage spaces, such as a refrigerating compartment and a freezing compartment, a door (not shown) opening and closing the refrigerating compartment and the freezing compartment, and a machine part (not shown) comprising a refrigerant cycle and maintaining the stored food at a low temperature.

The cabinet 10 has an insulation material filled between exterior surfaces forming a profile and interior surfaces defining storage spaces, to thereby increase the insulation effect. For this, as shown in FIG. 2, polyurethane foam 30 is filled between the interior surfaces 20 and exterior surfaces 10 of the cabinet in an assembled state, which is formed by injecting a polyurethane foam solution therebetween and then heating and foaming it. However, there is a limitation in enhancing the insulation performance since the air transmitting heat is impregnated in the polyurethane foam 30 and due to the thermal conduction properties of the polyurethane itself.

Accordingly, in order to enhance refrigeration efficiency and energy efficiency by further blocking a heat exchange between the storage spaces in the refrigerator and external air of the refrigerator, recently, as shown in FIG. 3, an improved insulation structure has started to be used, which further comprises a vacuum insulation panel between the cabinet exterior surfaces 10 and the cabinet interior surfaces 20, in addition to an insulation part 30 formed of polyurethane foam.

Specifically, the vacuum insulation panel 40, as shown in FIGS. 4 and 5, comprises a core material 41 having panels woven from glass fibers stacked thereon, and having vacuum formed between the panels, a sealing cover 42 formed of an aluminum laminated film for sealing and covering the core material 41 so as to maintain vacuum of the core material 41, and a getter 43 formed so as to maintain the insulation performance as the vacuum insulation panel for a sufficient time by removing a gas component flowing in through the insulation sealing cover 42.

As show in FIG. 6, the sealing cover 42 is formed by stacking an outermost layer 421 and a protective layer 422 both formed of a material resistant to an external impact, a gas shielding layer 423 of A1234 material (which is referred to as "1N30" in Japan) so as to prevent an external gas or moisture from penetrating into the core material 41, and a heating-fusion bonding layer 424 formed of a butane-base LLDP material with four carbons (C).

The vacuum insulation panel 40 covers the core material 41 with the sealing cover 42 in a vacuum condition, and then heating-fusion bonds the heating-fusion bonding layer 424 on the lower surface 42b of the sealing cover 42 and the heating-fusion bonding layer 424 of the upper surface 42a thereof, both of them bonded to each other, thereby separating the core material 41 from the outside.

To separate the core material 41 more completely from the outside, the upper and lower surfaces 42a and 42b of the sealing cover 42 are heating-fusion bonded at somewhat great length. Therefore, bonding portions 42a' and 42b' (42') protruded from the sides of the core material 41 are formed. The thus-formed vacuum insulation panel 40 is installed at a position, like in the refrigerator cabinet, in such a shape as shown in FIG. 7 by folding the bonding portions 42' and inserting them therein.

However, as shown in FIG. 8, when the bonding portions 42' are folded and installed at a predetermined position, this provides high insulation properties in the direction 98 in which the core material 41 formed of vacuum is penetrated, but the gas shielding layer 423 formed of a thin aluminum sheet having a thermal conductivity coefficient several thousand to several ten thousand times higher than that of the core material 41 is contained in the sealing cover 42. Thus, the quantity of thermal transfer through the gas shielding layer 423 is increased in the plate surface direction 99 of the sealing cover 42, thereby deteriorating the insulation properties.

As shown in FIG. 9, the bonding portions 42' protruded from the core material 41 and heating-fusion bonded have to be folded while the constructed sealing cover 42 is inserted and installed in the refrigerator cabinet 42'. In the folding procedure, pin holes 99 are generated in the gas shielding layer 423, and thus external air flows in through the pin holes to release the degree of vacuum of the core material 41, thereby abruptly deteriorating the insulation performance of the vacuum insulation panel 40 with the passage of time.

Besides, the gas shielding layer 423 of the thus-constructed sealing cover 42 has the problem that cracks are generated even by a slight bending due to a residual stress caused by a rolling process or the like, as well as the advantage of effectively preventing an external gas or moisture from penetrating into the vacuum insulation panel 40.

Therefore, with the sharp increase in oil price and the necessity of energy saving, there is an increasing demand for the vacuum insulation panel 40 that is applicable to various products, including a freezer and a refrigerator, and has a more excellent insulation performance.

DISCLOSURE OF THE INVENTION

Technical Problem

The present invention has been made in an effort to solve the problems in the related art, and has for its first object to prevent the insulation performance of a vacuum insulation panel from degradation by damage to a film by enhancing the strength of the film forming a sealing cover.

It is a second object of the present invention to prevent an external air or moisture from penetrating into a vacuum insulation panel by suppressing the generation of pin holes as much as possible even if bonding portions of the vacuum insulation panel are folded in the procedure of installing the vacuum insulation panel in the cabinet of a refrigerator, so that an excellent insulation performance can be maintained for a long period of time.

It is a third object of the present invention to provide a vacuum insulation panel, which prevents the degradation of the insulation performance as heat is transferred through the thickness direction of the vacuum insulation panel through a gas shielding layer stacked on the thin aluminum sheet in a sealing cover, and an insulation structure of a refrigerator applying the same.

It is a fourth object of the present invention to implement a unit for preventing an increase in the quantity of thermal transfer along a sealing cover at a low cost and easily.

It is a fifth object of the present invention to implement the above mentioned objects in much cheaper and simpler way.

Technical Solution

To accomplish the above-mentioned objects, there is provided a vacuum insulation panel according to the present invention, comprising: a core material; and a sealing cover including an outermost layer exposed to the outside, a heating-fusion bonding layer in contact with the core material, and an aluminum layer formed of a material having an iron (Fe) content of 0.7 wt % to 1.3 wt % between the outermost layer and the heating-fusion bonding layer, so as to cover the core material.

The aluminum layer is also referred to as a gas shielding layer.

The aluminum layer is for suppressing the generation of pin holes in the aluminum layer, even if folded, by increasing the content of iron (Fe) as compared to a conventional aluminum layer formed of an A1234 material containing 0.65 wt % of iron (Fe) so that grains are made finer and slippage between the grains is reduced at the time of product finishing such as rolling. If the content of iron (Fe) is smaller than 0.7 wt %, the frequency of generation of pin holes is sharply increased at the time of folding. If the content of iron (Fe) is larger than 1.3 wt %, an increase of elongation is limited. Thus, an optimal state can be maintained when the content of iron (Fe) is kept between 0.7 wt % to 1.3 wt %.

The heating-fusion bonding layer is formed of an octane-base LLDPE (Linear Low Density Polyethylene) with eight carbons (C). While a conventional heating-fusion bonding layer is formed of a butane-base LLDPE with four carbons (C), the heating-fusion bonding layer of the vacuum insulation panel according to the present invention is formed of an octane-base LLDPE with eight carbons (C), and has an enhanced heat resistance and sealing strength as compared to the conventional one.

In other words, in the procedure of bonding the sealing cover at upper and lower sides to each other in order to keep the degree of vacuum of the core material of the vacuum insulation panel, the degree of vacuum of the vacuum insulation panel is set according to the heat sealing strength of the heating-fusion bonding layer.

According to the result of an experiment, when the LLDPE was stretched by 10 mm by a UTM at 160° C. and a tensile stress corresponding to 3 kgf/cm$^2$ was applied thereto, the octane-base LLDPE with eight carbons (C) according to the present invention showed a heat sealing strength of 4.99 kgf/10 mm while the conventional butane-base LLDPE with four carbons (C) showed a strength of 4.39 kgf/10 mm. That is, it was seen that the LLDPE according to the present invention has enhanced heat seal strength of 16.3% as compared to the conventional LLDPE.

The outermost layer of the vacuum insulation panel according to the present invention is formed of two layers of nylon with excellent stretch. That is, another protective layer is formed on the outermost layer. The thickness thereof is 15 μm and 25 μm, respectively. Through these layers, the sealing cover is prevented from damaged by an external impact during handling or installation.

The outermost layer may be formed of K-PET, which is formed by coating PVDC (Polyvinylidene Chloride) on a PET base with a thickness of 12 μm to 13 μm by an inline coating method. The gas shielding properties of the K-PET are 10 times or higher excellent than those of the conventional PET.

At this time, the PVDC layer costs much, and is not soft enough to be used as the outermost layer, so it has to be used by coating to ensure the optimum gas shielding properties and durability. The PVDC layer is coated on the PET layer by an inline coating so that a deviation in the amount of application is minimized by a stretching effect, thereby avoiding every possibility of peeling.

To achieve the above-two kinds of properties, the outermost layer may be formed of a K-PET exposed to the exterior surface and a protective layer of nylon.

The aluminum layer is formed of an A8079 material. The contents of the conventional A1234 and the A8079 of this invention are as follows.

TABLE 1

|  | Si | Fe | Cu | Mn | Mg | Zn | Ti | Cr | Al |
|---|---|---|---|---|---|---|---|---|---|
| A1235 | 0.65↓ | 0.65↓ | 0.05↓ | 0.05↓ | 0.05↓ | 0.10↓ | 0.06↓ | — | 99.35 Min |
| A8079 | 0.05-0.30 | 0.70-1.30 | 0.05↓ | — | — | 0.10↓ | — | — | REM |

That is, as compared to the conventional A1235, the A8079 has a higher content of iron (Fe), and thus the grains are made finer, so that slippage between the grains becomes smaller at the time of product finishing, which enables it to achieve an advantageous effect of the reduction of a number of pin holes. Further, as the A8079 has a content distribution of other components than iron (Fe), it has far excellent tensile strength and elongation, which are mechanical properties, in comparison with the A1235.

Accordingly, when manufacturing a pouch, cracks of small size are less generated at bent portions or bonded portions, thereby enhancing the degree of sealing of the core material. Further, the A8079 has a small number of pin holes due to its material itself, and thus is suitable for an aluminum thin film that is adapted to a vacuum insulation panel.

Preferably, the aluminum layer has a thickness of 5 to 10 μm. If the thickness of the aluminum layer is less than 5 μm, the possibility of generation of cracks or defects in a rolling process becomes greater, which leads to a problem of increase in the fraction defective. If the thickness of the aluminum layer is greater than 10 μm, heat is transferred along the aluminum layer having a high thermal conductivity, which leads to a problem of decrease in the insulation effect.

An insulation structure of a refrigerator according to the present invention comprise: an exterior surface, formed of steel, of a refrigerator cabinet; an interior surface, formed of plastic, of the refrigerator cabinet; and a vacuum insulation panel disposed between the exterior and interior surfaces of the refrigerator cabinet. The insulation structure of a refrigerator may further comprise a refrigerator insulating portion formed of foam between the exterior and interior surfaces of the refrigerator cabinet.

Furthermore, to accomplish the above-mentioned objects, there is provided a vacuum insulation panel according to the present invention, comprising: a core material; a sealing cover formed in a manner to cover the core material, and having bonding portions some parts of which are bonded to each other so as to separate the core material from the outside; and an extended insulating portion extended from the core material between the bonding portions.

By providing an extended insulating portion extended between the bonding portions, even if the bonding portions protruded from the core material are folded in order to install the vacuum insulation panel in the refrigerator cabinet, the thermal transfer rate is decreased by lengthening a thermal transfer path from the thickness direction of the vacuum insulation panel to the plate surface direction of the sealing cover, thereby effectively preventing a thermal transfer in the thickness direction of the vacuum insulation panel along the plate surface direction of the sealing cover.

Preferably, the extended insulating portion is formed of vacuum so as to be manufactured easily and at a low cost.

At this point, the thickness of the extended insulating portion is 0.1 to 0.3 mm. If the thickness of the extended insulating portion is less than 0.1 mm, heat is transferred by conduction or radiation though a vacuum portion between the extended insulating portion and the sealing cover to thereby degrade the insulation performance. If the thickness of the extended insulating portion is greater than 3 mm, it is difficult to fold the bonding portions protruded from the sides of the core material to install the same at a predetermined position.

The extended insulating portion has a length (L') of 10 to 90% of the length (L) of the bonding portions. If the length (L') of the extended insulating portion is less than 10% of the length (L) of the bonding portions, the degree of bypassing the thermal transfer path is small, resultantly degrading the insulating performance. If the length (L') of the extended insulating portion is greater than 90% of the length (L) of the bonding portions, the bonding capability of the bonding portions is degraded.

An insulation structure of a refrigerator according to the present invention further comprise: an exterior surface, formed of steel, of a refrigerator cabinet; an interior surface, formed of plastic, of the refrigerator cabinet; and a vacuum insulation panel disposed between the exterior and interior surfaces of the refrigerator cabinet, and provided with a core material having an extended insulating portion. The insulation structure of a refrigerator may further comprise a refrigerator insulating portion formed of foam between the exterior and interior surfaces of the refrigerator cabinet.

Furthermore, to accomplish the above-mentioned objects, there is provided a vacuum insulation panel according to the present invention, comprising: a core material; a sealing cover having a protective layer, a gas shielding layer, and a heating-fusion bonding layer stacked thereon, for covering the core material; and a gas permeation preventing layer formed of a material preventing gas permeation on the sealing cover.

This is to prevent an external gas or moisture from penetrating into the core material by the gas permeation preventing layer formed on the sealing cover even if pin holes are generated on the gas shielding layer formed of aluminum thin films stacked in the sealing cover.

It is effective for the gas permeation preventing layer to cover the corners of the core material. Because there is a high possibility of generation of pin holes on the gas shielding layer formed of aluminum thin films stacked in the sealing cover in the procedure of being folded at the corners, the effect of gas permeation prevention can be maximized in spite of the generation of pin holes.

It is effective for the gas permeation preventing layer to be formed even at the bonding portions that are protruded from the sealing cover and heating-fusion bonded. Since the bonding portions, generated when the core material is inserted into the vacuum insulation panel and the vacuum insulation panel is heating-fusion bonded, are folded in the procedure of installing the vacuum insulation panel in the refrigerator cabinet or the like, an external gas can be prevented from flowing into the core material in spite of pin holes on the gas shielding layer generated at the folded portions.

The gas permeation preventing layer is formed from the corners of the core material at a width D1-d and D2-d corresponding to 5 to 20% of the width (W) or length (L) of the core material. This can reduce the cost induced by the formation of the gas permeating prevention layer although the gas permeation preventing layer may be formed with respect to the overall area of the sealing cover. If the gas permeation preventing layer is formed smaller than 5% of the width or length of the core material, there is a possibility that the gas permeation preventing layer should be formed in a manner not to cover the corners. If the gas permeation preventing layer exceeds 20% of the width or length of the core material, it costs much.

Especially, it is preferred that the gas permeation preventing layer is coated with metal particles because a layer formed of metal particles has the effect of preventing permeation of gas or moisture. Among the metal particles, it is effective to coat with aluminum particles having an excellent gas permeation preventing effect by any one method from among plasma coating, PVD (physical vapor deposition), and evaporation.

The gas permeation preventing layer formed of metal particles has a thickness of 0.5 to 2 μm. If the thickness of the gas permeation preventing layer is less than 0.5 μm, the performance of preventing permeation of gas or moisture is degraded. If the thickness of the gas permeation preventing layer is greater than 2 μm, the process of forming the gas permeation preventing layer takes long time and the cost of material of the gas permeation preventing layer increases.

Regarding this, while the thin aluminum sheet in the sealing cover is generally subject to a defect at the thin sheet structure manufactured by rolling even if it has a thickness of 0.5 to 2.0 μm, which is much smaller than the thickness of about 7 μm, the gas permeation preventing layer according to the present invention has no pin holes generated therein even at a small thickness because it is coated with metal particles, thereby effectively preventing the permeation of gas or moisture.

Meanwhile, the gas permeation preventing layer may be coated with a ceramic insulating paint, rather than with metal particles, such as aluminum or the like. By this, as compared to being coated with metal particles, the manufacturing cost becomes much lower, and the permeation of gas or moisture is prevented. However, the thickness of the paint is typically larger than 2 μm, this may cause a larger resistance than when the bonding portions extended from the core material are folded.

Likewise, the gas permeation preventing layer may be formed by adhesion using an adhesion tape. This can easily prevent the permeation of moisture of gas without equipment for forming the gas permeation preventing layer.

An insulation structure of a refrigerator according to the present invention further comprise: an exterior surface, formed of steel, of a refrigerator cabinet; an interior surface, formed of plastic, of the refrigerator cabinet; and a vacuum insulation panel disposed between the exterior and interior surfaces of the refrigerator cabinet, and provided with a gas permeation preventing layer. The insulation structure of a refrigerator may further comprise a refrigerator insulating portion formed of foam between the exterior and interior surfaces of the refrigerator cabinet.

Furthermore, to accomplish the above-mentioned objects, there is provided a vacuum insulation panel according to the present invention, comprising: a core material; and a sealing cover having an outermost layer exposed to the outside, a heating-fusion bonding layer in contact with the core material, and a gas shielding layer formed of a thin metal sheet at some regions between the outermost layer and the heating-fusion bonding layer and a metal deposition film at the other regions between the outermost layer and the heating-fusion bonding layer, for covering the core material.

Generally, the thin metal sheet or metal laminated film manufactured by rolling processing is subject to the generation of pin holes by bending, and thermal conduction occurs to it a lot along the film by a high thermal conductivity, however, the permeation of external gas or moisture can be effectively prevented at a position where no pin holes are generated. On the other hand, although a metal deposition film has less thermal leakage caused by a thermal transfer along the film because no pin holes are generated by bending and the thermal conductivity is low, the performance of preventing the permeation of external gas or moisture is degraded as compared to the thin metal sheet.

Accordingly, of the thin metal sheet, the portion where pin holes are likely to be generated is formed of a metal deposition film, and the portion where no pin holes are likely to be generated is formed of a thin metal sheet, thereby maximizing the insulation performance of the gas permeation preventing layer. Moreover, since the thermal transfer rate of the metal deposition film is much smaller than that of the thin metal sheet, in case of a rectangular parallelpiped core material, the rate of thermal transfer along the plate surface direction of the corners or sides of the vacuum insulation panel can be reduced to a large extent.

The thus-constructed sealing cover is easily manufactured by stacking the sealing cover, with the thin metal sheet and the metal deposition film arranged side by side between the outermost layer and the heating-fusion bonding layer.

The thin metal sheet formed of aluminum has a thickness of 6 to 10 μm, and the deposition film formed by deposition of aluminum has a thickness of 1 to 3 μm.

Pin holes tend to be generated in the regions having an angle, such as the corners, thus the gas shielding layer formed of metal deposition film is formed in a manner to cover the corners of the vacuum insulation panel.

Generally, taking into account the dimension of the core material formed in a rectangular parallelpiped, it is preferred that the gas shielding layer formed of metal deposition film extends from the corners of core the material by the length D1 and D2 corresponding to 5 to 35% of the width (W) or length (L) of the core material. Since the metal deposition film has a much smaller rate of thermal transfer than the thin metal sheet does, in case of the rectangular parallelpiped core material, the rate of thermal transfer along the plate surface direction of the cover film of the corners or sides can be reduced to a large extent.

Meanwhile, there is provided a vacuum insulation panel according to the present invention, comprising: a core material; and a sealing cover having an outermost layer exposed to the outside, a heating-fusion bonding layer in contact with the core material, a first gas shielding layer formed of a metal deposition film between the outermost layer and the heating-fusion bonding layer and a second gas shielding layer formed of a thin metal sheet so as to cover parts of the area of the core material, for covering the core material.

This is to manufacture a sealing cover having a high insulation performance without an effort to arrange the metal deposition film and the thin metal sheet side by side, by arranging the thin metal sheet to be overlapped in the region where pin holes are less likely to be generated, with the metal deposition film being stacked in advance between the outermost layer and the heating-fusion bonding layer. The metal deposition film does not need to be stacked with respect to the entire portion between the outermost layer and the heating-fusion bonding layer.

Even if the metal deposition film and the thin metal sheet locally overlaps, because their thickness ranges from 10 to 20 μm, the insulation performance is not deteriorated by the thickness of the sealing cover covering the vacuum insulation panel, or there is no difficulty in installing the vacuum insulation panel at a position, like in the refrigerator cabinet.

Likewise, since the thermal transfer rate of the metal deposition film is much smaller than that of the thin metal sheet, in case of a rectangular parallelpiped core material, the rate of thermal transfer along the plate surface direction of the sealing cover can be reduced to a large extent by forming the corners or the side surface of the core material only of the first gas shielding layer.

The thin metal sheet is also referred to as a metal laminated film.

Pin holes are more likely to be generated if the thin metal sheet is folded. Thus, it is effective for the second gas shielding layer formed of the thin metal sheet to be formed so as to cover the center portion that does not include the corners of the core material.

At this point, it is effective that the center portion is a portion surrounded by the portion spaced apart from the corners of the core material by the length D1 and D2 corresponding to 5 to 35% of the width (W) or length (L) thereof.

Since the metal deposition film has a much smaller rate of thermal transfer than the thin metal sheet does, in case of the rectangular parallelpiped core material, the rate of thermal transfer along the plate surface direction of the sealing cover of the corners or the side surface of the core material can be reduced to a large extent.

Meanwhile, there is provided a vacuum insulation panel according to the present invention, comprising: a core material; a first sealing cover having an outermost layer exposed to the outside, a heating-fusion bonding layer in contact with the core material, and a metal deposition film formed between the outermost layer; and a second sealing cover having an outermost layer exposed to the outside, a heating-fusion bonding layer in contact with the core material, and a thin metal sheet formed between the outermost layer and the heating-fusion bonding layer. The first sealing cover and the second sealing cover are bonded and connected to cover the core material.

At this point, the bonded and connected portion is not limited to the configuration in which the sides of the first sealing cover and of the second sealing cover are engaged to each other, but involves the configuration in which they are bonded and connected so that a predetermined region is overlapped. Typically, the thickness of the sealing cover itself falls within the range of 50 to 100 μm. Thus, even if they are bonded and connected so that a predetermined region is overlapped, this does not cause a serious degradation in the insulation performance of sealing and bonding the core material.

Likewise, the first sealing cover including the metal deposition film has a less possibility of pin hole generation even if folded, so it is formed so as to cover the portions except the center portion that does not include the corners of the core material.

At this point, it is effective that the center portion is a portion surrounded by the portion spaced apart from the corners of the core material by the length D1 and D2 corresponding to 5 to 35% of the width (W) or length (L) thereof.

The thin metal sheet is a thin aluminum sheet, and the metal deposition film is formed of an aluminum deposition film because aluminum has a high thermal conductivity, and is superior in the effect of preventing the permeation of gas or moisture. Preferably, the thin aluminum sheet has a thickness of 5 to 10 μm. If the thickness of the thin aluminum sheet is less than 5 μm, the possibility of generation of cracks or defects in the rolling process becomes higher, thus increasing the fraction defective. If the thickness of the thin aluminum sheet is greater than 10 μm, thermal is transferred along the thin aluminum sheet having a high thermal conductivity, thereby decreasing the insulation effect.

Meanwhile, there is provided a vacuum insulation panel according to the present invention, comprising: an exterior surface, formed of steel, of a refrigerator cabinet; an interior surface, formed of plastic, of the refrigerator cabinet; and a vacuum insulation panel disposed between the exterior and interior surfaces of the refrigerator cabinet. The insulation structure of a refrigerator may further comprise a refrigerator insulating portion formed of foam between the exterior and interior surfaces of the refrigerator cabinet.

MODE FOR THE INVENTION

Hereinafter, a vacuum insulation panel according to a first embodiment of the present invention will be described in detail with reference to the accompanying drawings.

Figure 10:
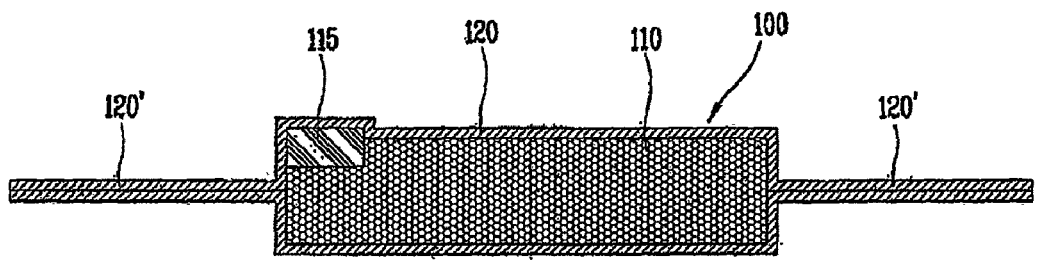
FIG. 10 is a sectional view showing the construction of a vacuum insulation panel according to a first embodiment of the present invention.
Figure 11:
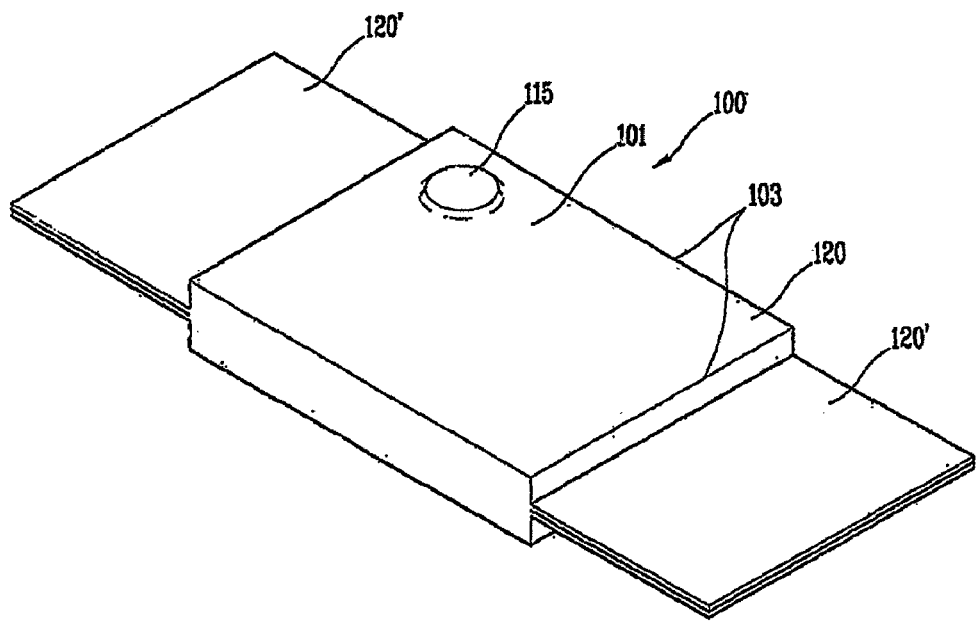
FIG. 11 is a perspective view showing an external shape of FIG. 10.
Figure 12:
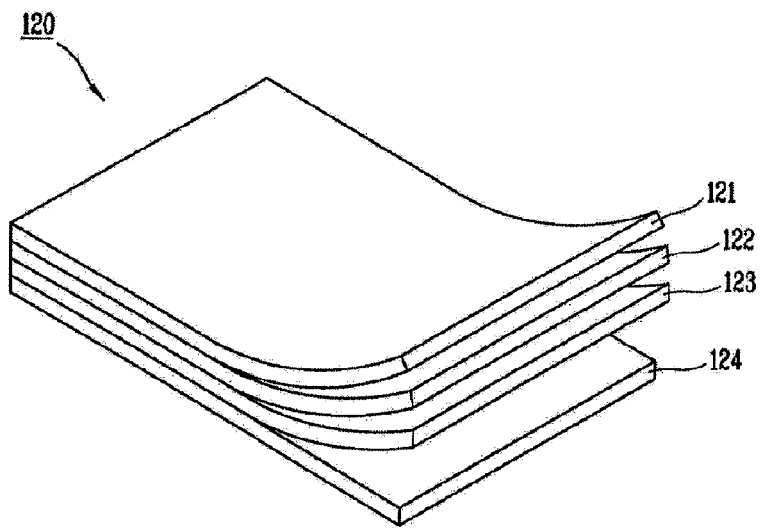
FIG. 12 is a view showing the construction of a sealing cover of FIG. 10.
Figure 13A:
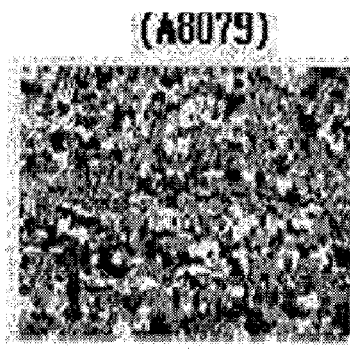
FIGS. 13A and 13B are structural views showing the structure of a gas shielding layer of FIG. 10.
Figure 13B:
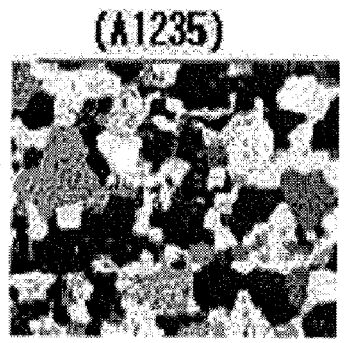
Figure 14:
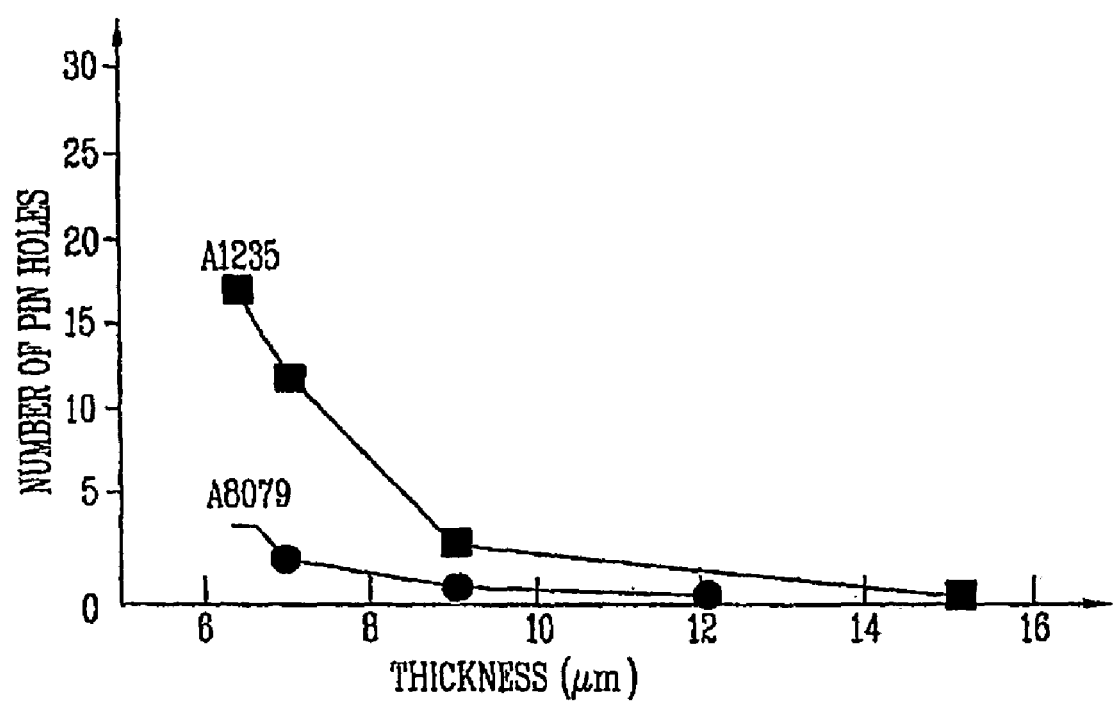
FIG. 14 is a diagram showing the distribution of the number of pin holes depending on the thickness of the gas shielding layer of FIG. 12.
Figure 15:
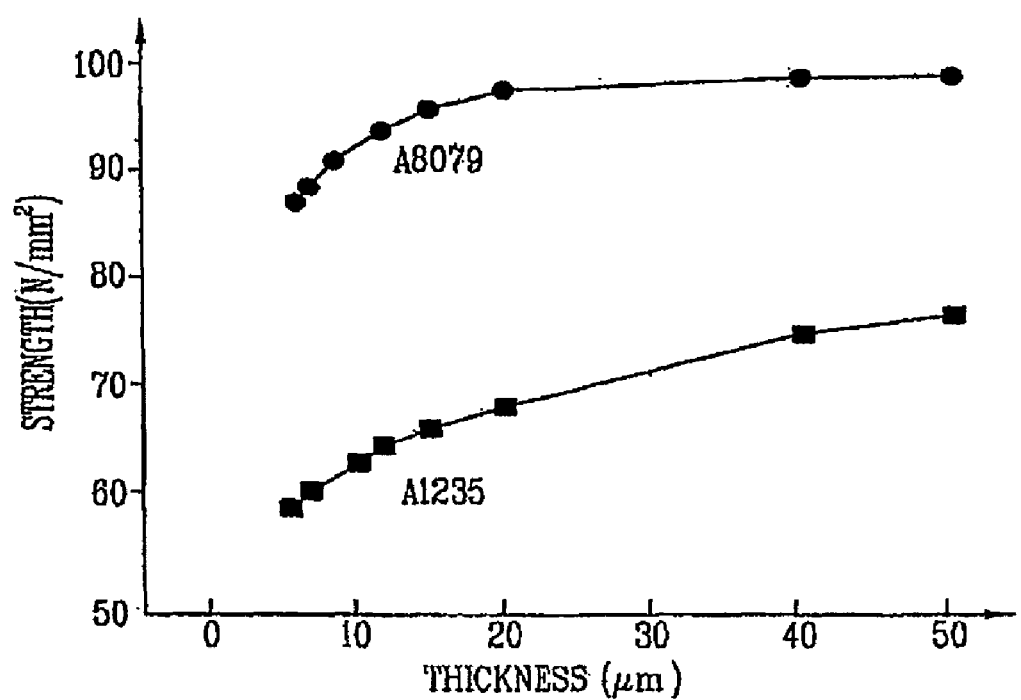
FIG. 15 is a diagram showing the distribution of strength depending on the thickness of the gas shielding layer of FIG. 12.
Figure 16:
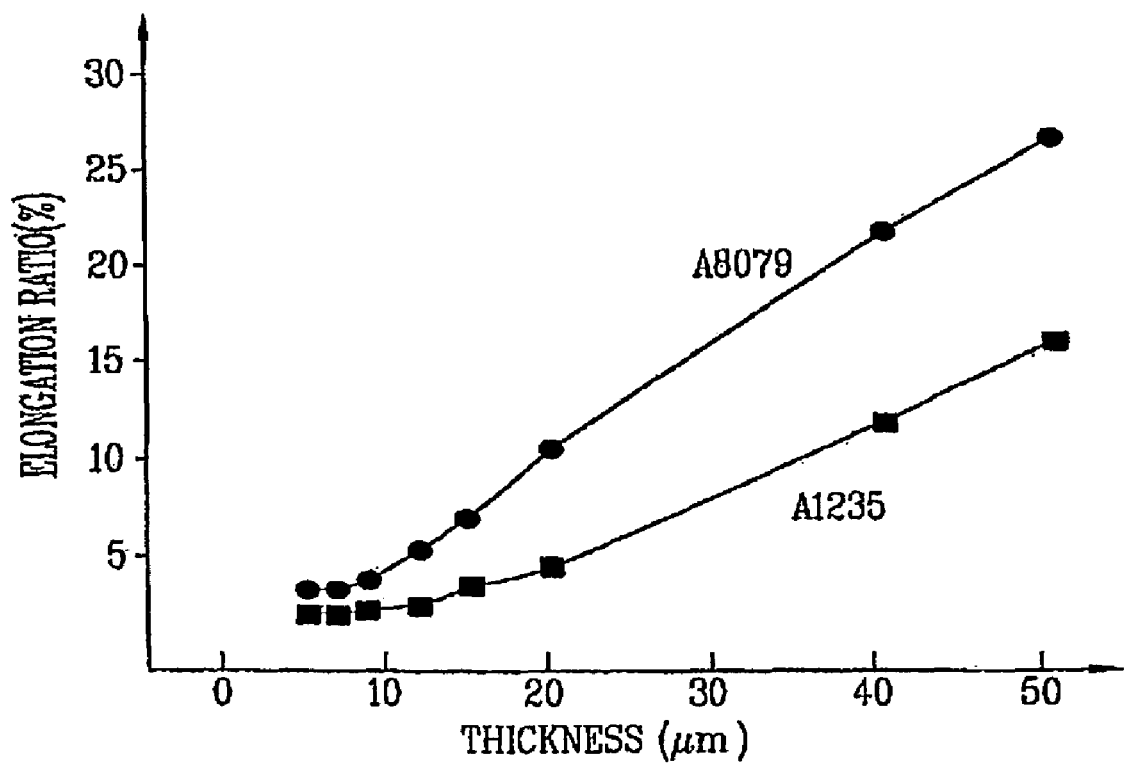
FIG. 16 is a diagram showing the distribution of elongation depending on the thickness of the gas shielding layer of FIG. 12.

FIG. 10 is a sectional view showing the construction of a vacuum insulation panel according to a first embodiment of the present invention. FIG. 11 is a perspective view showing an external shape of FIG. 10. FIG. 12 is a view showing the construction of a sealing cover of FIG. 10. FIGS. 13A and 13B are structural views showing the structure of a gas shielding layer of FIG. 10. FIG. 14 is a diagram showing the distribution of the number of pin holes depending on the thickness of the gas shielding layer of FIG. 12. FIG. 15 is a diagram showing the distribution of strength depending on the thickness of the gas shielding layer of FIG. 12. FIG. 16 is a diagram showing the distribution of elongation depending on the thickness of the gas shielding layer of FIG. 12.

As shown in FIGS. 10 and 11, the vacuum insulation panel according to the first embodiment of the present invention comprises a core material 110 having panels woven from glass fibers stacked thereon, and having vacuum formed between the panels, a sealing cover 120 formed in a manner to seal and cover the core material 110 so as to maintain vacuum of the core material 110, and a getter 115 interposed in layer form between the core material 110 so as to maintain the insulation performance as the vacuum insulation panel for a sufficient time by removing a gas component flowing in through the sealing cover 120.

The core material 110 is formed of glass fibers known to have the most excellent insulation properties, and can achieve a high insulation effect because it is formed by stacking panels woven from as thin glass fibers as possible.

As shown in FIG. 12, the sealing cover 120 comprises: an outermost layer 121 formed of nylon so as to be exposed to the exterior surface of the vacuum insulation panel 100, a protective layer 122 stacked on the bottom surface of the outermost layer 121, an aluminum layer 123 stacked on the bottom surface of the protective layer 122, and a heating-fusion bonding layer 124 stacked on the bottom surface of the aluminum layer 123 and kept in contact with the core material 110.

The outermost layer 121 is formed of nylon with excellent stretch at a thickness of about 25 μm. The protective layer 122 is also formed of nylon with excellent stretch at a thickness of about 15 μm. This can prevent damage caused by an external impact generated during the assembly or installation of the vacuum insulation panel 110. Particularly, taking into account that vacuum insulation panels has been recently manufactured in a large size for enhancing the efficiency of a vacuum insulation panel for a refrigerator, which makes the possibility of defects during the manufacturing higher, the possibility of defects can be avoided in advance by preventing damage caused by an external impact or scratch.

The aluminum layer 123 is a gas shielding layer stacked in order to prevent an external gas or moisture from penetrating into the core material 110, and is of A8000 material, with an iron (Fe) content of 7 to 1.3 wt %, more preferably, A8079 material. As shown in FIG. 13a and FIG. 13b, the A8079 material is subject to a reduction of the slippage between the grains because the grains are made finer as compared to the conventional A1235, and thus can resist a finishing process such as rolling as the allowable stress acceptable by the material itself becomes larger, thereby increasing the softness. Therefore, as shown in FIG. 14, provided that the thickness is 10 μm, the aluminum layer 123 according to the present invention, has pin hole-resistant properties three times higher than the conventional aluminum layer has.

Moreover, as shown in FIG. 15, the A8079 material has a more excellent strength and elongation than the A1234 has. Accordingly, the aluminum layer 123 of the vacuum insulation panel 100 applying the A8079 can prevent defects from being produced in the aluminum layer 123 by properly dispersing the stress applied from the outside when handling.

The heating-fusion bonding layer 124 is formed of an octane-base LLDPE (Linear Low Density Polyethylene) with eight carbons (C) at a thickness of about 50 μm; unlike a conventional butane-base LLDPE with four carbons (C), and has an enhanced heat-resistant performance and sealing strength. By bonding the heating-fusion bonding layer 124 of the bonding portions 120' protruded while in contact with the top and bottom surfaces of the core material 110 to each other, the degree of vacuum of the core material 110 can be maintained more effectively.

As above, the sealing cover 120 according to the first embodiment of the present invention constructed of a stack of the outermost layer 121, the protective layer 122, the aluminum layer 123, and the heating-fusion bonding layer 124 shows an oxygen permeability of 0.005 cc/m$^2$ under the environment of a relative humidity of 0% and a temperature of 23° C. for 48 hours and a water vapor transmission rate of 0.005 g/m$^2$ under the environment of a relative humidity of 100% and a temperature of 38° C. for 48 hours. Thus, it can be seen that the sealing cover 120 has an excellent performance in preventing the permeation of air or moisture from the outside.

Additionally, even if the bonding portions 120' are folded while installing the vacuum insulation panel 100 at a predetermined position, the generation of pin holes is suppressed to thus maintain a superior insulation effect for a long period of time.

Hereinafter, a second embodiment of the present invention will be described in detail with reference to the accompanying drawings.

Figure 17:
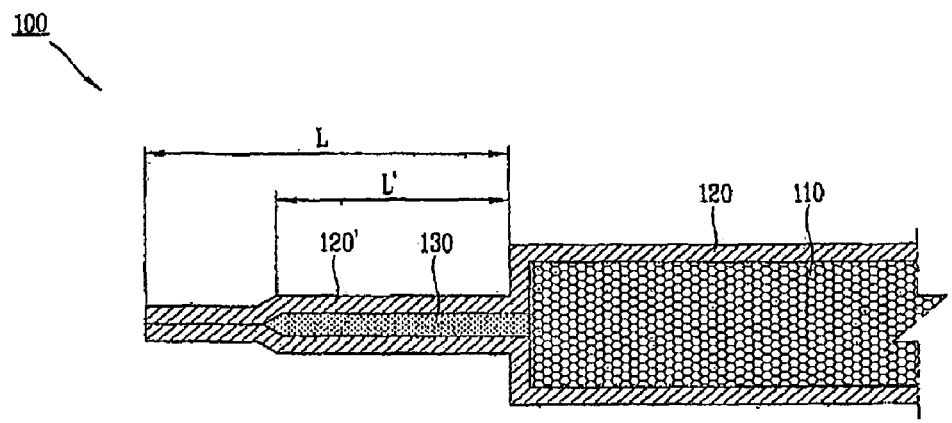
FIG. 17 is a partial sectional view showing the construction of a vacuum insulation panel according to a second embodiment of the present invention.
Figure 18:
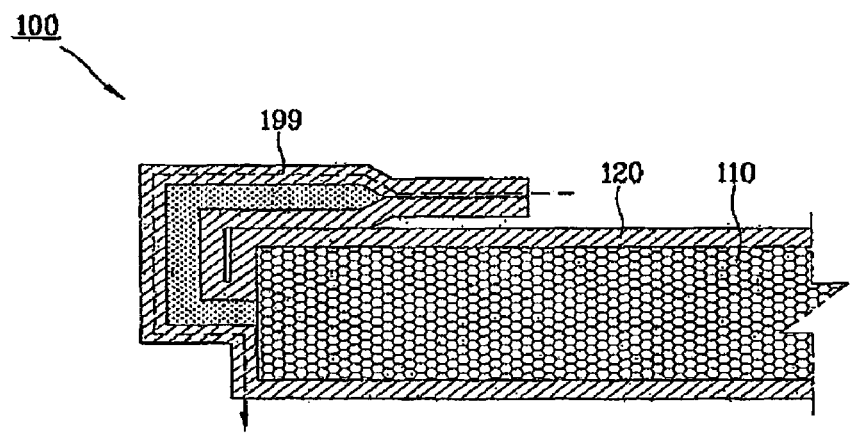
FIG. 18 is a view showing a folded form of bonding portions of FIG. 17.

FIG. 17 is a partial sectional view showing the construction of a vacuum insulation panel according to a second embodiment of the present invention. FIG. 18 is a view showing a folded form of bonding portions of FIG. 17.

As shown in FIG. 17, the vacuum insulation panel according to the second embodiment of the present invention comprises a core material 110 having panels woven from glass fibers stacked thereon, and having vacuum formed between the panels, a sealing cover 120 formed in a manner to seal and cover the core material 110 so as to maintain vacuum of the core material 110, an extended insulating portion 130 extended from the sides of the core material 110 between bonding portions 120' where the sealing cover 120 is bonded, and a getter 115 interposed in layer form between the core material 110 so as to maintain the insulation performance as the vacuum insulation panel for a sufficient time by removing a gas component flowing in through the sealing cover 120.

The core material 110 is formed of glass fibers known to have the most excellent insulation properties, and can achieve a high insulation effect because it is formed by stacking panels woven from as thin glass fibers as possible.

The sealing cover 120 comprises an outermost layer (not shown) and a protective layer (not shown) formed of nylon so as to be exposed to the exterior surface of the vacuum insulation panel 100, a gas shielding layer (not shown) stacked in a thin aluminum sheet having a thickness of about 7 μm on the bottom surface of the protective layer, and a heating-fusion bonding layer (not shown) stacked on the bottom surface of the gas shielding layer and kept in contact with the core material 110. Though a detailed structure of the sealing cover is not shown in the drawings, the outermost layer, protective layer, gas shielding layer, and heating-fusion bonding layer correspond to reference numerals 121, 122, 123, and 124 of FIG. 12, respectively.

The outermost layer and the protective layer serve to prevent damage by an eternal impact generated during the manufacturing or installation of the vacuum insulation panel 100, the gas shielding layer serves to prevent an external gas or moisture from penetrating into the core material 110, and the heating-fusion bonding layer is bonded by heat and serves to separate the outside of 760 torr and the core material in a vacuum state of less than 0.001 torr from each other.

Figure 5:
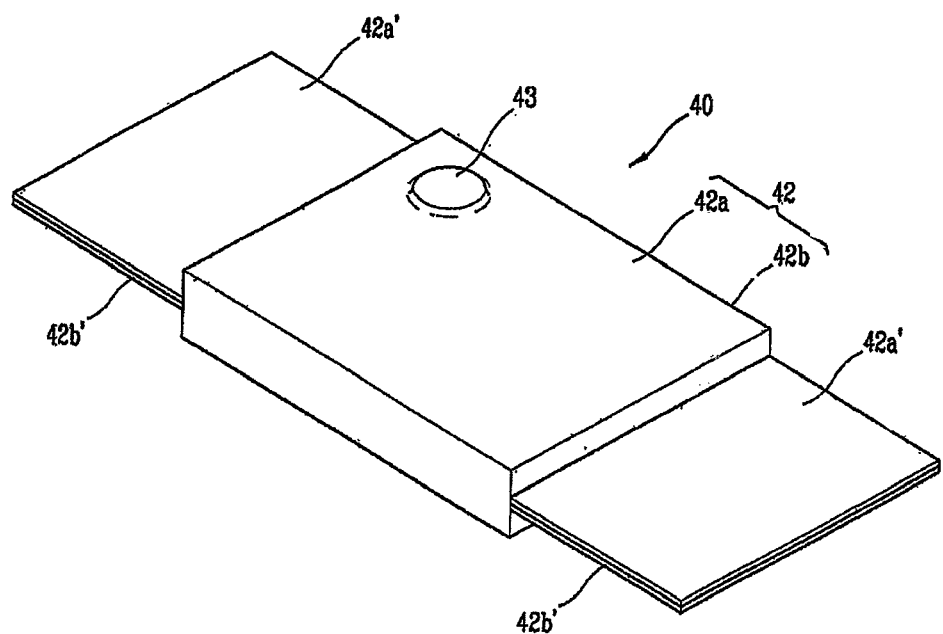
FIG. 5 is a perspective view showing the construction of the vacuum insulation panel of FIG. 4.
Figure 6:
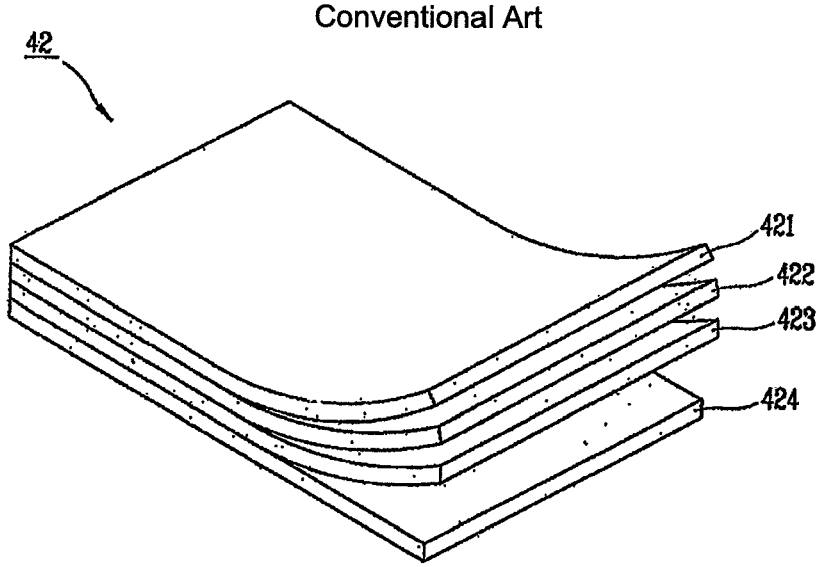
FIG. 6 is a view showing the stacked configuration of a sealing cover of FIG. 4.
Figure 7:
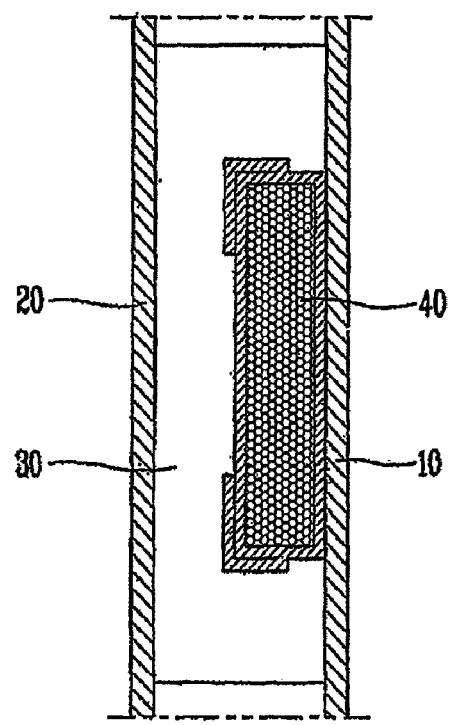
FIG. 7 is a sectional view showing the vacuum insulation panel of FIG. 4 being mounted on a refrigerator cabinet.
Figure 8:
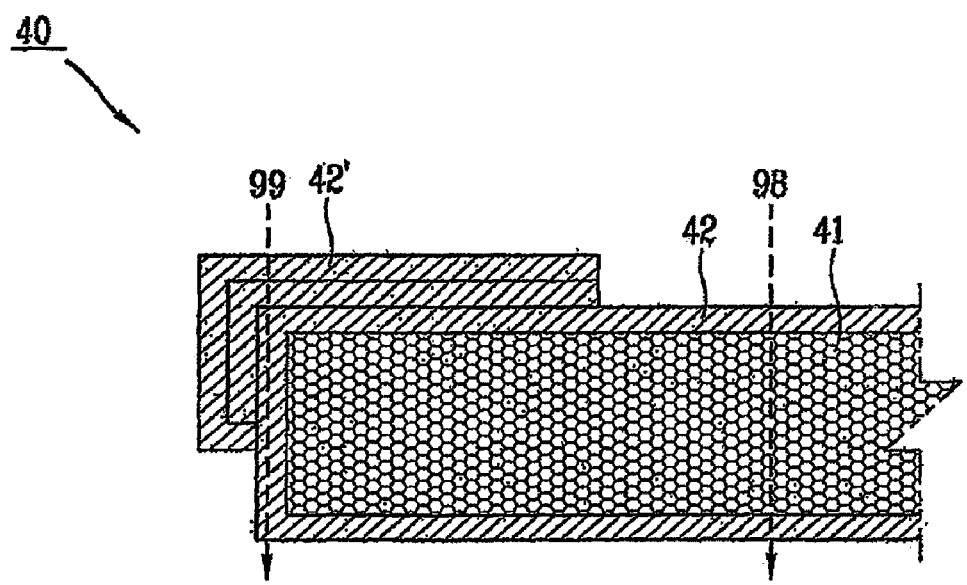
FIG. 8 is a partial sectional view of FIG. 4 for explaining a thermal transfer path of the vacuum insulation panel of FIG. 4.

The extended insulating portion 130 is formed of a vacuum at a thickness of 0.1 to 0.3 mm between the heating-fusion bonding layer of the sealing cover 120. For this, when the sealing cover 120, which is opened at one end, and the core material 110 are put into a vacuum chamber, heat is applied to the portions except the portions where the extended insulating portion 130 is desired to be formed at the middle of the heating-fusion bonding layer (corresponding to the inner surfaces of reference numerals 42a and 42b of FIG. 5) of the inner sides of the sealing cover 120 facing each other. The vacuum of the extended insulating portion 130 has a higher insulation performance than the sealing cover that is made from aluminum laminated film.

By this, the heating-fusion bonding layer to which heat is applied is tightly contacted and bonded to each other, and the portions with no heat applied thereto are in a vacuum state where they are not tightly contacted to each other, to thus form the extended insulating portion 130. In order to intentionally precisely adjust the thickness of the extended insulating portion 130, grooves having a predetermined stepped portion are formed at the sealing cover 120. Alternatively, the heating-fusion bonding layer may be bonded by applying heat only to the region where no groove is formed. Subsequently, the thickness of the extended insulating portion 130 can be formed at a depth corresponding to the depth of the grooves.

In order to install the thus-constructed vacuum insulation panel 100 according to the second embodiment of the present invention at a position such as a refrigerator cabinet, as shown in FIG. 18, even if the bonding portions 120' protruded from the sides of the core material 110 are folded, the thermal transfer path is blocked by the extended insulating portion 130 protruded from the sides of the core material 110. Thus, unless the vacuum insulation panel 100 is bypassed in a direction indicated by reference numeral 199, thermal transfer is not performed through the thickness direction of the vacuum insulation panel 100.

Accordingly, in spite of the gas shielding layer formed of aluminum in the sealing cover 120, thermal transfer along the plate surface direction of the sealing cover 120 can be minimized.

Although the second embodiment of the present invention has illustrated the case where the extended insulating portion 130 formed between the bonding portions 120' of the sealing cover 120 is formed in a vacuum state, the scope of the present invention is not limited thereto, but a material having an superior insulation performance may be inserted or a gas having an excellent insulation performance may be filled in the extended insulating portion 130.

Hereinafter, a third embodiment of the present invention will be described with reference to the accompanying drawings.

Figure 19:
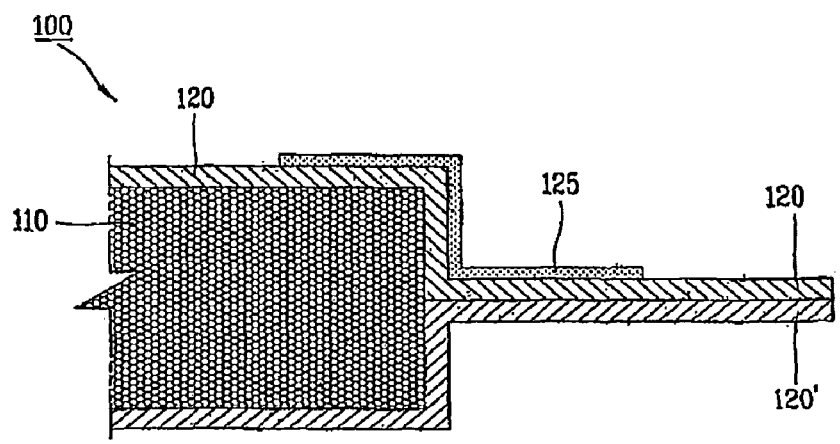
FIG. 19 is a schematic view showing the construction of a vacuum insulation panel according to a third embodiment of the present invention.
Figure 20:
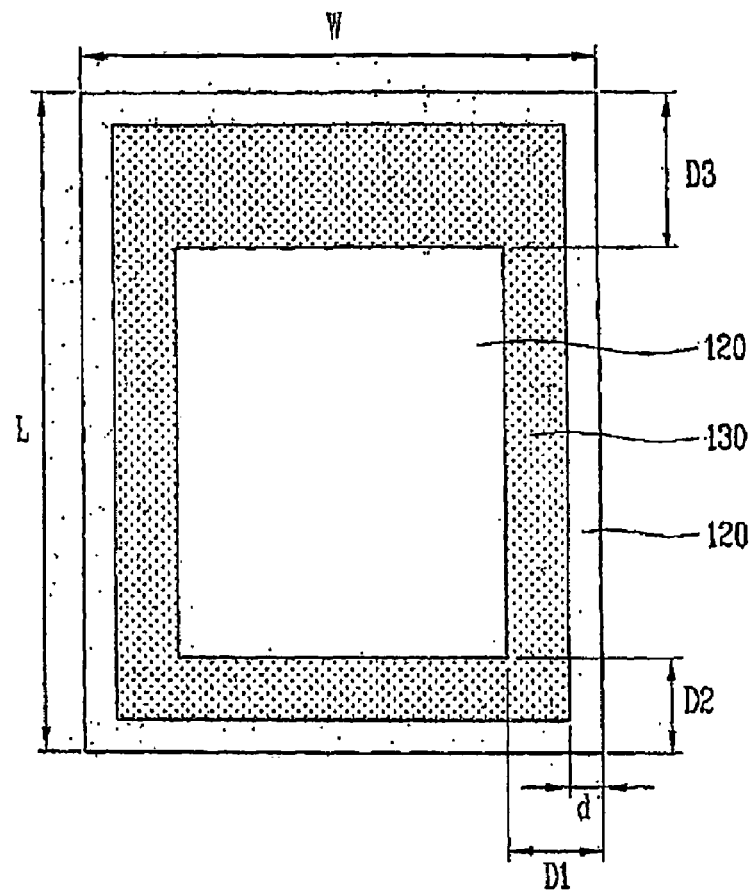
FIG. 20 is a plane view of FIG. 19.
Figure 21:
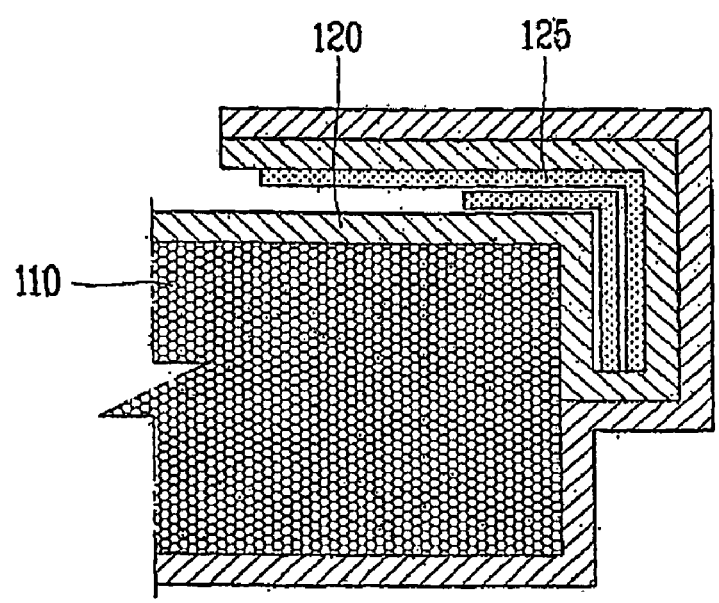
FIG. 21 is a view showing the construction of bonding portions of the vacuum insulation panel of FIG. 19 in a folded state.
Figure 22:
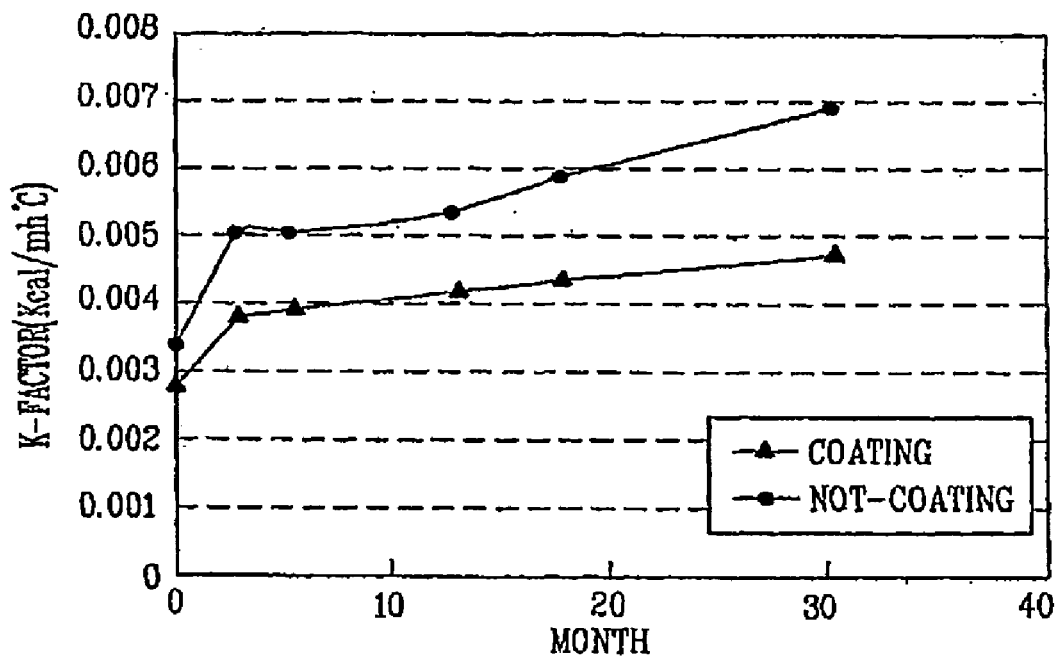
FIG. 22 is experimental data showing the difference in thermal conduction coefficient between the conventional vacuum insulation panel and the vacuum insulation panel according to the third embodiment of the present invention.

FIG. 19 is a schematic view showing the construction of a vacuum insulation panel according to a third embodiment of the present invention. FIG. 20 is a plane view of FIG. 19. FIG. 21 is a view showing the construction of bonding portions of the vacuum insulation panel of FIG. 19 in a folded state. FIG. 22 is experimental data showing the difference in thermal conduction coefficient between the conventional vacuum insulation panel and the vacuum insulation panel according to the third embodiment of the present invention.

As shown in FIG. 19, the vacuum insulation panel according to the second embodiment of the present invention comprises a core material 110 having panels woven from glass fibers stacked thereon, and having vacuum formed between the panels, a sealing cover 120 formed in a manner to seal and cover the core material 110 so as to maintain vacuum of the core material 110, a gas permeation preventing layer 125 coated with aluminum particles on some surfaces of the sealing cover 110 so as to prevent permeation of gas or moisture, and a getter 115 interposed in layer form between the core material 110 so as to maintain the insulation performance as the vacuum insulation panel for a sufficient time by removing a gas component flowing in through the sealing cover 120.

Figure 9:
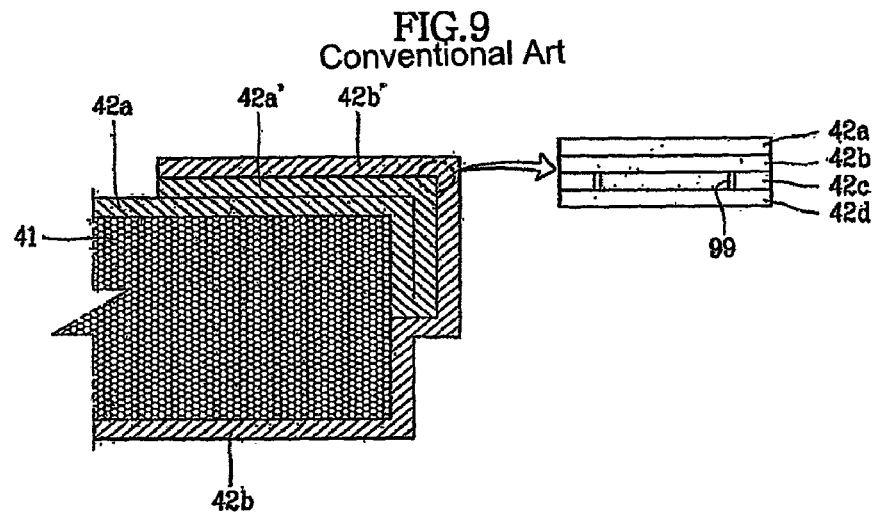
FIG. 9 is a sectional view showing the "A" portion of FIG. 4 in a folded state.

However, generally, in the procedure of covering the core material 110 formed in a rectangular parallelpiped shape with the sealing cover 120, as shown in FIG. 9, there is problem that pin holes are generated in the gas shielding layer formed of a thin aluminum plate 423 at the corners of the core material 110 and the folded portions of the bonding portions 120'. Thus, as shown in FIG. 19, the gas permeation preventing layer 125 coated with aluminum particles is formed on the surface of the sealing cover 110 so as to cover the corners and the bonding portions 120'.

The gas permeation preventing layer 125 is formed around the folded portions (including the corners) of the sealing cover 120 covering the core material 110. Thus, referring to FIG. 20, in the sealing cover 120, which is opened only at the other end as both sides are bonded and one end is enclosed, it is preferred that the gas permeation preventing layer 125 is not formed at the edge portion (d) because the edge portion (d) is not a folded portion but only forms the sides of the core material 110.

Typically, considering the shape of the rectangular parallelpiped core material 110, it is desirable that the edge portion (d) from the edges of the sealing cover 120 to the gas permeation preventing layer 125 is ½ of the height of the sides of the core material 110, for example, 2 to 5% of the width (W) or length (L) of the core material 120, so that the gas permeation preventing layer 125 is not formed on the sides of the core material 110.

To sufficiently cover the corners of the core material 110, the width D1-d and D2-d of the gas permeation preventing layer 125 is formed at 5 to 20% of the width (W) or length (L) of the core material 110. For reference, in case of a vacuum insulation panel used for a refrigerator cabinet, it is appropriate for the width D1-d and D2-d of the gas permeation preventing layer 125 to be formed at about 60 to 70 mm.

In the meantime, when the core material 110 is put in the sealing cover 120 and is in a vacuum state, if heat is applied to the heating-fusion bonding layer for separating it from the outside, bonding portions 120' extended in one direction of the vacuum insulation panel 100 are formed. At this point, in the procedure of installing the vacuum insulation panel 100 with the bonding portions 120' at a position, like in a refrigerator cabinet, the bonding portions 120' are folded as shown in FIG. 21.

Therefore, it is preferred that the gas permeation preventing layer 125 is formed at an opened end of the sealing cover 120 where the bonding portions 120' are formed in such a manner to cover the bonding portions 120' or cover a folded position of the bonding portions 120', if the purpose of use of the vacuum insulation panel 100 is specified. Accordingly, referring to FIG. 20, the width D3-d of the gas permeation preventing layer 125 formed on the surfaces of the opened end of the sealing cover 120 is thick enough as compared to other areas.

The gas permeation preventing layer 125 is formed of fine aluminum particles on the sealing cover 120 by being coated by a PVD (physical vapor deposition) method, an electron beam evaporation method, and a sputtering method.

FIG. 22 shows experimental data of the thermal conduction coefficient of the vacuum insulation panel 100 with respect to the case where the gas permeation preventing layer 125 is formed at a thickness of about 1 mm by a method of evaporation of aluminum particles based on the above-described technical concept (wherein the core material is formed of glass fibers, and the getter is not inserted and installed with respect to two samples). From this, it can be seen that even if the gas permeation preventing layer 125 is formed at a thickness of only 1 μm, the insulation performance of the vacuum insulation panel 100 is improved by 20 to 30%. Particularly, the longer the period of use, the higher insulation properties the vacuum insulation panel 100 according to the present invention keeps.

Although the third embodiment of the present invention has illustrated the case where aluminum particles are coated on the gas permeation preventing layer 125 for preventing gas or moisture from penetrating into the core material 110 even if pin holes are generated in the gas shielding layer of the sealing cover 120, the present invention also involves the coating with any kind of metal particles capable of preventing the permeation of gas or moisture.

Additionally, the gas permeation preventing layer 125 is not limited to being coated only with metal particles, but may be formed by applying a paint having superior insulation properties thereto at as small a thickness as possible, and more easily, may be formed by attaching an adhesive tape thereto.

Hereinafter, the fourth embodiment of the present invention will be described in detail with reference to the accompanying drawings.

Figure 23:
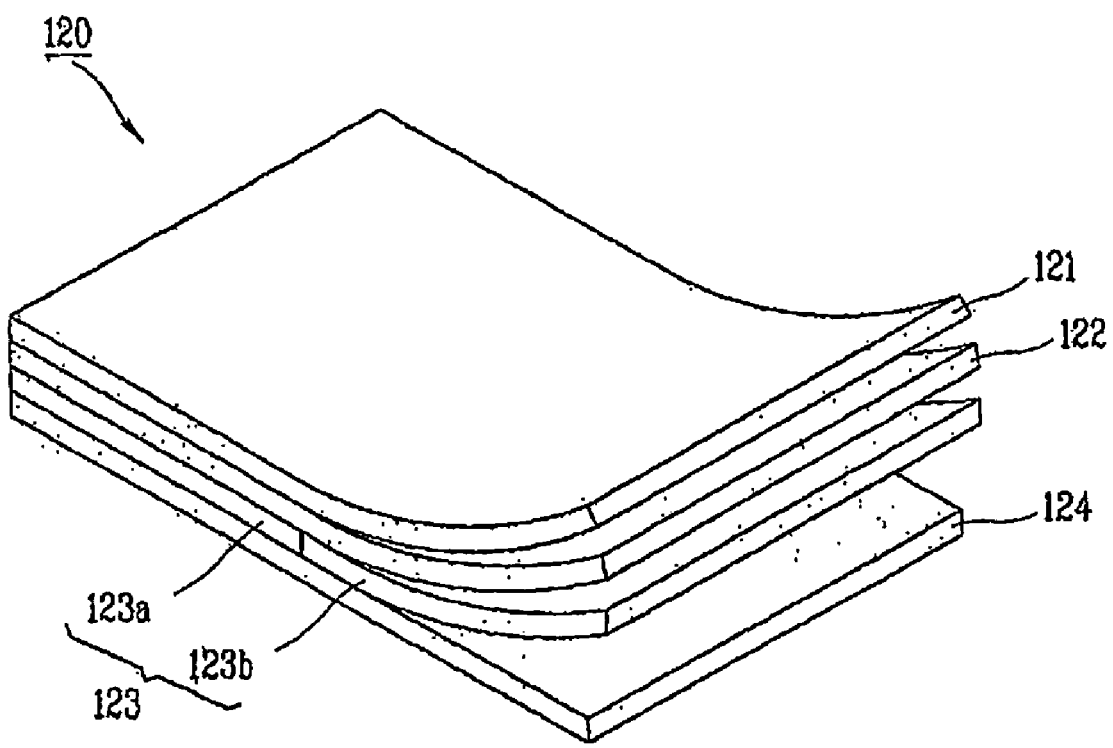
FIG. 23 is a view showing the stacked configuration of a sealing cover according to a fourth embodiment of the present invention.
Figure 24:
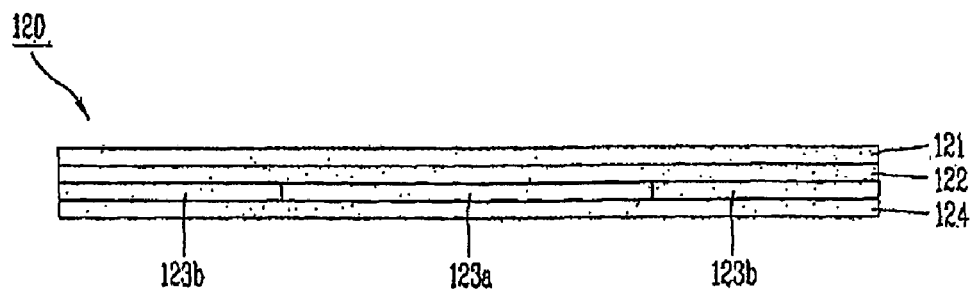
FIG. 24 is a side view of FIG. 23.
Figure 25:
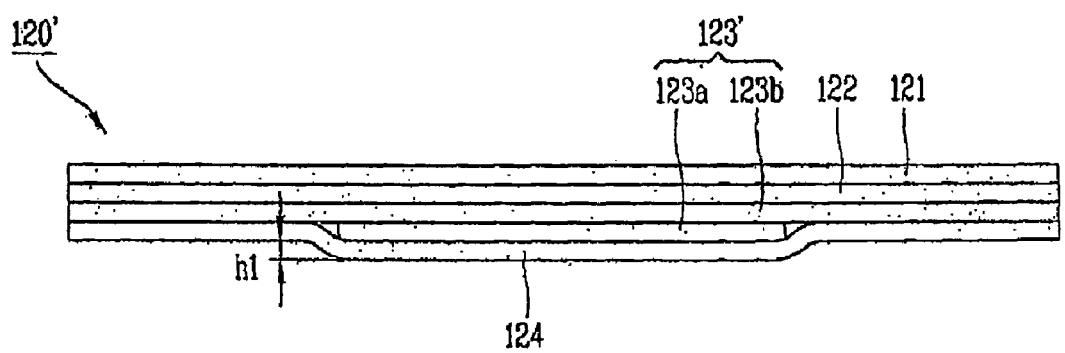
FIG. 25 is a side view of the sealing cover of a vacuum insulation panel according to a modified embodiment of FIG. 23.
Figure 26:
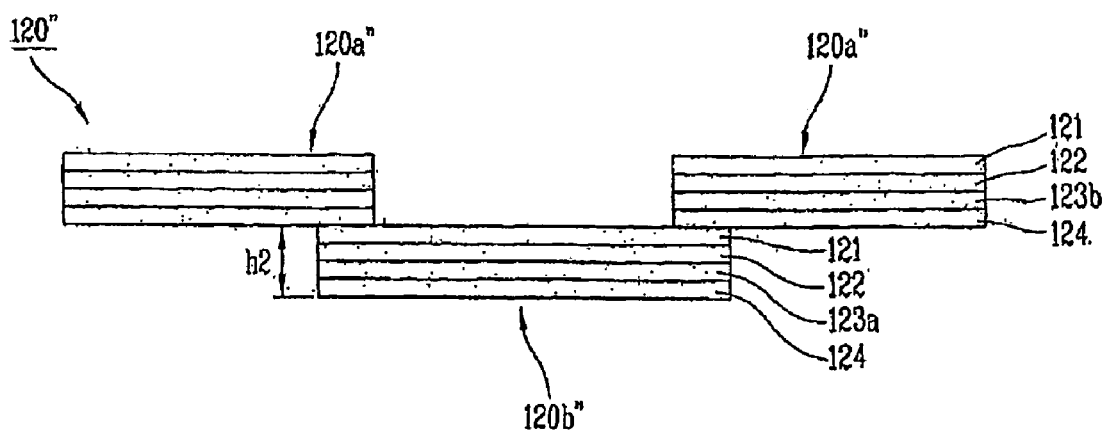
FIG. 26 is a side view of the sealing cover of a vacuum insulation panel according to another modified embodiment of FIG. 23.
Figure 27:
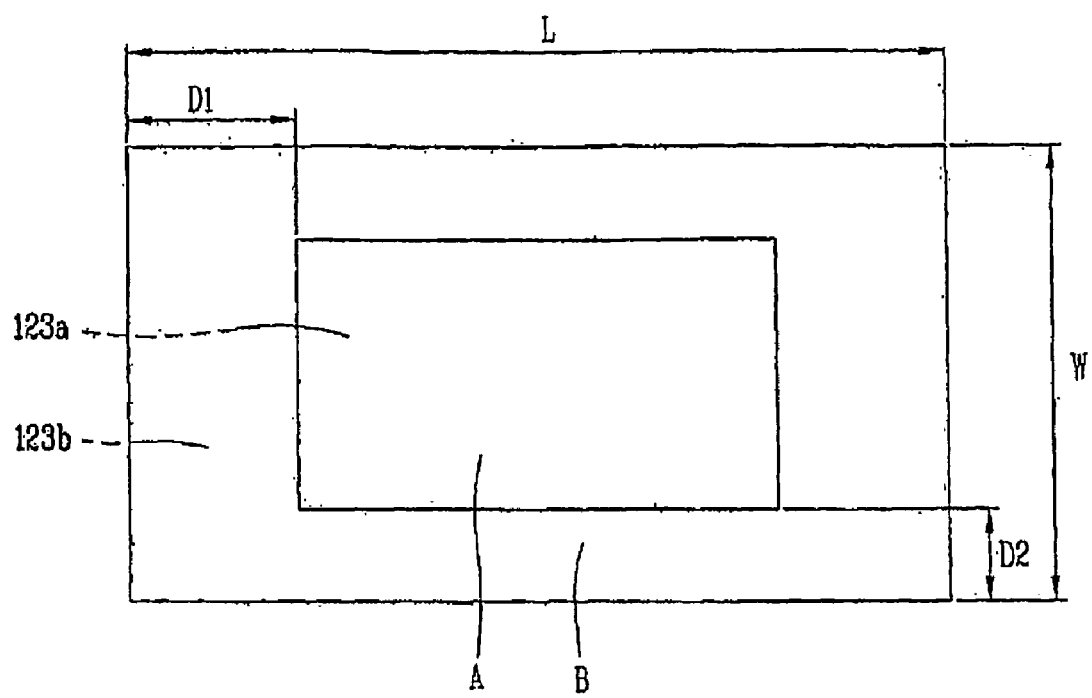
FIG. 27 is a schematic view showing the region occupied by a thin aluminum sheet on the sealing cover of FIGS. 24 through 26.

FIG. 23 is a view showing the stacked configuration of a sealing cover according to a fourth embodiment of the present invention. FIG. 24 is a side view of FIG. 23. FIG. 25 is a side view of the sealing cover of a vacuum insulation panel according to a modified embodiment of FIG. 23. FIG. 26 is a side view of the sealing cover of a vacuum insulation panel according to another modified embodiment of FIG. 23. FIG. 27 is a schematic view showing the region occupied by a thin aluminum sheet on the sealing cover of FIGS. 24 through 26.

As shown in FIGS. 23 and 24, a sealing cover 120 of a vacuum insulation panel 100 according to the fourth embodiment of the present invention comprises an outermost layer 121 formed of nylon so as to be exposed to the exterior surface of the vacuum insulation panel 100, a protective layer 122 stacked on the bottom surface of the outermost layer 121, a gas shielding layer 123 having a thin aluminum sheet 123*a* and an aluminum deposition film 123*b* stacked side by side on the bottom surface of the protective layer 122, and a heating-fusion bonding layer 124 stacked on the bottom surface of the aluminum layer 123 and kept in contact with the core material 110.

The outermost layer 121 is formed of nylon with excellent stretch at a thickness of about 25 μm. The protective layer 122 is also formed of nylon with excellent stretch at a thickness of about 15 μm. This can prevent damage caused by an external impact generated during the assembly or installation of the vacuum insulation panel 110.

Particularly, taking into account that vacuum insulation panels has been recently manufactured in a large size for enhancing the efficiency of a vacuum insulation panel for a refrigerator, which makes the possibility of defects during the manufacturing higher, the possibility of defects can be avoided in advance by preventing damage caused by an external impact or scratch.

The gas shielding layer 123 is stacked in order to prevent an external gas or moisture from penetrating into the core material 110, which is formed in such a manner that the region formed of the aluminum deposition film 123*b* covers the corners 103 and sides 102 of the vacuum insulation panel of FIG. 11. By this, if this region is formed of a thin aluminum sheet, the portion where pin holes are likely to be generated is formed of a metal deposition film 123*b*, and the portion where no pin holes are likely to be generated is formed of a thin metal sheet 123*a*, thereby maximizing the insulation performance of the gas permeation preventing layer 125.

Moreover, the aluminum deposition film 123*b* has a much smaller thermal transfer rate depending on the thermal conductivity as compared to the thin aluminum sheet. Thus, since the thermal transfer rate of the aluminum deposition film 123*b* is much smaller than that of the thin aluminum sheet, in case of a rectangular parallelpiped core material 110, the rate of thermal transfer along the plate surface direction of the cover film can be reduced to a large extent by forming the corners or the side surface of the core material 110 of the aluminum deposition film 123*b*.

For this, taking into account the dimension of the rectangular parallelpiped vacuum insulation panel used for insulation of a refrigerator cabinet, as shown in FIG. 27, it is preferred that the thin aluminum sheet 123*a* is formed in a manner to cover the center portion (A) of the top and bottom surfaces 101 of the vacuum insulation panel 100 surrounded by the portion spaced apart from the corners of the core material 110 by the length D1 and D2 corresponding to 5 to 35% of the width (W) or length (L) of the core material. By uniformly setting the region to be covered by the thin aluminum sheet 123*a* in this manner, it becomes easier to mass-produce the sealing cover 120 for the vacuum insulation panel utilizing the core material 110 which is varied in size but similar in the ratio of each corner to each corner of the rectangular parallelpiped.

In applying the thin aluminum sheet 123*a* to the vacuum insulation panel, although the thicker the thin aluminum sheet 123*a*, the more excellent the effect of preventing the permeation of gas or moisture, there is a problem that the rate of thermal transfer caused by thermal conduction along the plate surface direction is high. However, the sides 102 of the vacuum insulation panel 100 are formed of an aluminum deposition film 123*b* having low thermal conduction properties, thus it is possible to more effectively prevent an external gas or moisture from penetrating into the vacuum insulation panel 100 by forming the thin aluminum sheet 123*a* thick.

The thus-constructed sealing cover 120 is easily manufactured by stacking the thin aluminum sheet 123*a* and the aluminum deposition film 123*b* to be arranged side by side between the protective layer 122 and the heating-fusion bonding layer 124.

The heating-fusion bonding layer 124 is formed of an octane-base LLDPE (Linear Low Density Polyethylene) with eight carbons (C) at a thickness of about 50 μm, unlike a conventional butane-base LLDPE with four carbons (C), and has an enhanced heat-resistant performance and sealing strength. By bonding the heating-fusion bonding layer 124 of the bonding portions 120' protruded while in contact with the top and bottom surfaces of the core material 110 to each other, the degree of vacuum of the core material 110 can be maintained more effectively.

Hereinafter, one modified example of the fourth embodiment of the present invention will be described.

FIG. 25 is a side view of the sealing cover 120' of a vacuum insulation panel according to one modified example of the fourth embodiment of the present invention. As shown in FIG. 25, the vacuum insulation panel according to the one modified example of the fourth embodiment of the present invention has the same construction as that of the vacuum insulation panel 100 of the fourth embodiment, except for the structure of a sealing cover 120'.

That is, the aluminum deposition film 123*b* is stacked as a first gas shielding layer so that the gas shielding layer 123' of the sealing cover 120' occupies the entire area between the protective layer 122 and the heating-fusion bonding layer 124, and the thin aluminum sheet 123*a* is stacked as a second gas shielding layer on the bottom surface of the aluminum deposition film 123*b* only with respect to the region of the center portion (A) of FIG. 27.

This is to manufacture a sealing cover having a high insulation performance without an effort to arrange the aluminum deposition film 123*b* and the thin aluminum sheet 123*a* side by side, by arranging the thin aluminum sheet 123*a* to be overlapped in the region where pin holes are less likely to be generated, with the aluminum deposition film 12*b* being stacked in advance between the protective layer 122 and the heating-fusion bonding layer 124.

Unlike in FIG. 25, it does not matter even if the aluminum deposition film 123b does not cover the entire region of the center portion (A). That is, it may be also possible to form a through hole in the aluminum deposition film 123b with respect to an area smaller than the region corresponding to the center portion (A), and locally overlap it with the thin aluminum sheet 123a. The height (h1) of a stepped portion formed by the thin aluminum sheet 123a and the aluminum deposition film 123b overlapping each other corresponds to the height of the thin aluminum sheet 123a. Typically, the thin aluminum sheet 123a used for a vacuum insulation panel is formed thinner than 10 μm so as to lower the rate of thermal transfer along the plate surface direction, thus the height (h1) of such a slight stepped portion does not exert an adverse effect on the insulation performance of the vacuum insulation panel.

Similarly to the above-described fourth embodiment, the thin aluminum sheet 123a is formed only at the center portion (A) of the top and bottom surfaces 101 of the vacuum insulation panel, excluding the sides 102 or corners 103 thereof, there is an advantage that the thin aluminum sheet 123a, which is no less than 100 μm and thicker than the conventional one, is applicable.

Similarly to the fourth embodiment as shown in FIG. 24, if the thin aluminum sheet 123a is folded, pin holes are more likely to be generate, and in order to minimize the rate of thermal transfer along the plate surface direction of the sides of the vacuum insulation panel 100, the second gas shielding layer formed of the thin aluminum sheet 123a is formed in a manner to cover the center portion (A) of the top and bottom surfaces 101 that does not include the corners 103 of the vacuum insulation panel 100.

Hereinafter, another modified example of the fourth embodiment of the present invention will be described.

FIG. 26 is a side view of the sealing cover of a vacuum insulation panel according to another modified example of the fourth embodiment of the present invention. As shown in FIG. 26, the vacuum insulation panel according to the another modified example of the fourth embodiment of the present invention has the same construction as that of the vacuum insulation panel 100 of the fourth embodiment of FIG. 24, except for the structure of a sealing cover 120″.

That is, the sealing cover 120″ is constructed by bonding and connecting a first sealing cover 120a″ formed of an aluminum deposition film 123b between the protective layer 122 and the heating-fusion bonding layer 124 and parts of a second sealing cover 120b″ formed of a thin aluminum sheet 123a between the protective layer 122 and the heating-fusion bonding layer 124 to each other.

At this time, if the thin aluminum sheet 123a is folded, pin holes are more likely to be generated, and in order to minimize the rate of thermal transfer along the plate surface direction of the sides of the vacuum insulation panel 100, the second sealing cover 120b″ including the thin aluminum sheet 123a is formed in a manner to cover only the center portion (A) of the top and bottom surfaces 101 that does not include the corners 103 and sides 102 of the vacuum insulation panel 100, and the other regions (B) are formed of the first sealing cover 120a″.

In this case, a stepped portion is formed at a thickness (h2) of the second sealing cover 120b. Since the thickness (h2) of the second sealing cover 120b″ is less than the range of 100 to 200 μm, thus an adverse effect on the insulation performance of the vacuum insulation from the height (h2) of the stepped portion is ignorable.

Although preferred embodiments of the present invention have been described for illustrative purposes, the scope of the present invention should not be limited to the described specific embodiments. Rather, various changes and modifications can be made within the spirit and scope of the present invention, as defined by the following claims.

Figure 1:
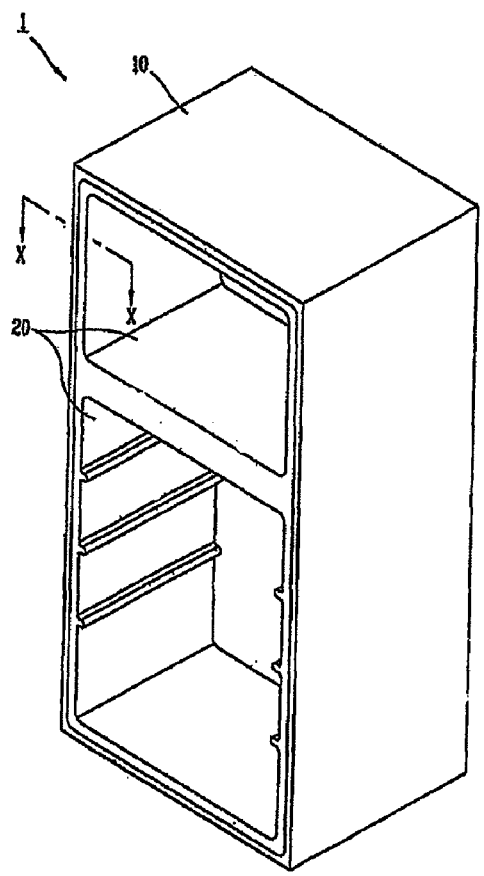
FIG. 1 is a perspective view of a refrigerator cabinet.
Figure 2:
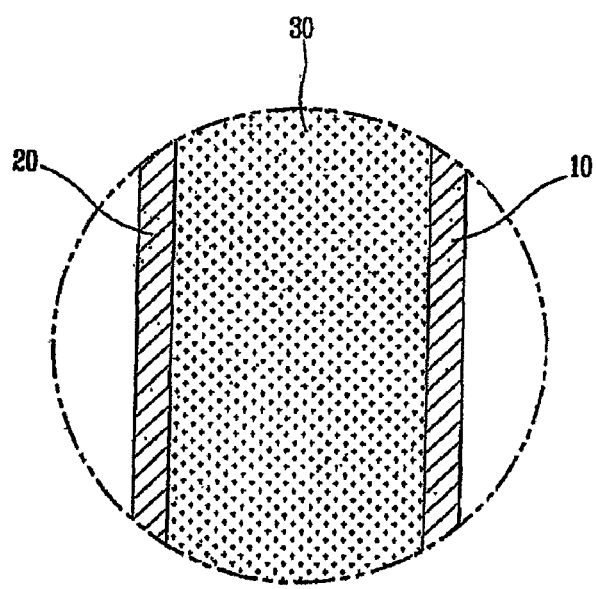
FIG. 2 is a sectional view of a conventional insulation structure along cut line X-X of FIG. 1.
Figure 3:
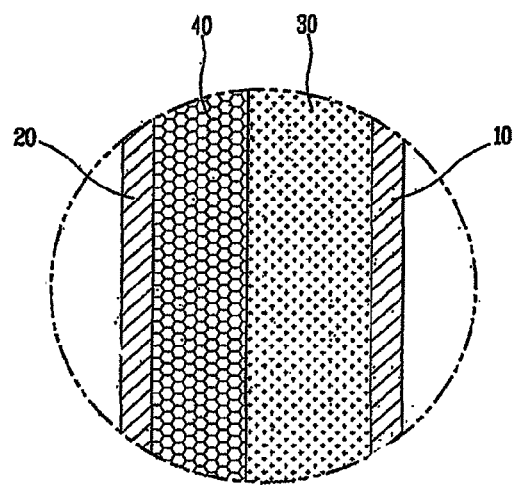
FIG. 3 is a sectional view of a conventional insulation structure in another form along cut line X-X of FIG. 1.
Figure 4:
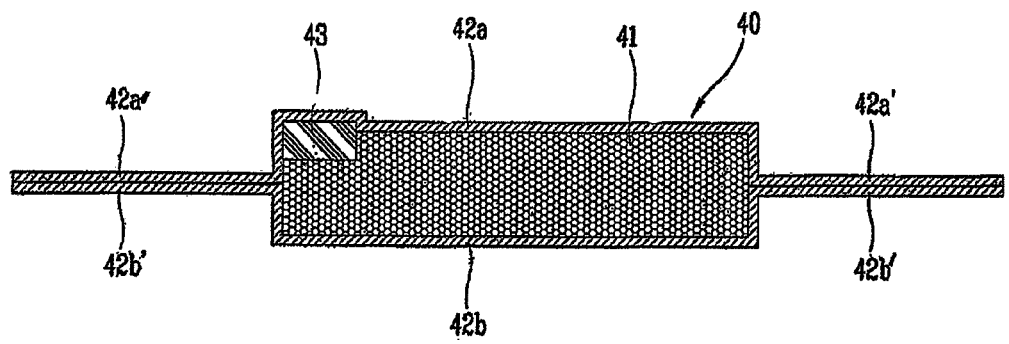
FIG. 4 is a sectional view showing the construction of a vacuum insulation panel of FIG. 1.

It will be apparent that the vacuum insulation panel according to the above-described embodiments is applicable to the insulation structure of a refrigerator cabinet as shown in FIGS. 1 and 2, and the insulation structure of a refrigerator cabinet having such a configuration also falls within the scope of the present invention.

INDUSTRIAL APPLICABILITY

As described above, according to the present invention, there are provided a vacuum insulation panel, which comprises: a core material; and a sealing cover including an outermost layer exposed to the outside, a heating-fusion bonding layer in contact with the core material, and a gas shielding layer, stacked with aluminum, formed of a material having an iron (Fe) content of 0.7 wt % to 1.3 wt % between the outermost layer and the heating-fusion bonding layer, and formed so as to cover the core material, and which prevents an external air or moisture from penetrating into a vacuum insulation panel by suppressing the generation of pin holes as much as possible even if bonding portions of the vacuum insulation panel are folded in the procedure of installing the vacuum insulation panel in the cabinet of a refrigerator, so that an excellent insulation performance can be maintained for a long period of time, and an insulation structure of a refrigerator applying the same.

The present invention prevents the insulation performance from being deteriorated due to a damage or defect generated in the vacuum insulation panel in the procedure of installing the vacuum insulation panel as an insulating material in the cabinet of a refrigerator or the like by providing a cover film formed of two layers of nylon at the outermost layer.

In the present invention, the heating-fusion bonding layer is formed of an octane-base LLDPE with eight carbons (C), and has an enhanced heat resistance and sealing strength as compared to the conventional one.

According to the present invention, there are provided a vacuum insulation panel, which comprises: a core material; a sealing cover formed in a manner to cover the core material, and having bonding portions some parts of which are bonded to each other so as to separate the core material from the outside; and an extended insulating portion extended from the core material between the bonding portions, and which have enhanced insulation performance in the thickness direction of the vacuum insulation panel along the plate surface direction of the sealing cover by decreasing the thermal transfer rate by lengthening a thermal transfer path from the thickness direction of the vacuum insulation panel to the plate surface direction of the sealing cover, even if the bonding portions protruded from the core material are folded in order to install the vacuum insulation panel in the refrigerator cabinet, and an insulation structure of a refrigerator applying the same.

Furthermore, the present invention provides a vacuum insulation panel which enhances insulation performance by forming the extended insulating portion of vacuum with a small thickness, and does not cause inconvenience in handling.

According to the present invention, there are provided a vacuum insulation panel, which comprises: a core material; a sealing cover having a protective layer, a gas shielding layer, and a heating-fusion bonding layer stacked thereon, for covering the core material; and a gas permeation preventing layer formed of a material preventing gas permeation on the sealing cover, and which effectively prevents an external gas or moisture from penetrating into the core material by the gas permeation preventing layer formed on the sealing cover even if pin holes are generated on the gas shielding layer formed of aluminum thin films stacked in the sealing cover, thereby offering a far superior reliability as compared to the conventional art, and an insulation structure of a refrigerator applying the same.

Furthermore, the present invention is applicable to installations of various purposes because an excellent insulation effect can be maintained for a long period of time in spite of pin holes of the vacuum insulation panel, and there is no difficulty in folding the extended portion to the vacuum insulation panel by forming a gas permeation preventing layer at a very small thickness.

According to the present invention, there are provided a vacuum insulation panel, which comprises: a core material; and a sealing cover having an outermost layer exposed to the outside, a heating-fusion bonding layer in contact with the core material, and a gas shielding layer formed of a thin metal sheet at some regions between the outermost layer and the heating-fusion bonding layer and a metal deposition film at the other regions between the outermost layer and the heating-fusion bonding layer, for covering the core material, and which eliminates in advance the possibility of generation of pin holes in the gas permeation preventing layer in the sealing cover, and enhances insulation performance by minimizing the rate of thermal transfer along the plate surface direction of the sides of the vacuum insulation panel, and an insulation structure of a refrigerator applying the same.

Furthermore, the present invention provides a vacuum insulation panel which has an excellent insulation performance, and is manufactured easily and at a low cost by the above-described construction.

Moreover, the present invention has the advantage that the life span of the vacuum insulation panel is improved, as well as reducing the amount of the getter, because the permeation of gas or moisture from the outside can be minimized by adjusting the thermal bridge, the air permeability, and the moisture permeability by adjusting the ratio of the metal deposition film to the thin metal sheet (or laminated film) as above.

The invention claimed is:

1. A vacuum insulation panel, comprising:
a core material;
a sealing cover including a plurality of layers, an innermost layer being in contact with the core material, and having bonding portions, parts of the bonding portions bonded to each other so as to separate the core material from the outside; and
an extended insulating portion formed by having a space between innermost layers of the sealing cover facing each other and disposed in unbonded parts of the bonding portions with a length long enough to cover a near corner of the vacuum insulation panel.

2. The vacuum insulation panel of claim 1, wherein the extended insulation portion is kept in a vacuum state.

3. The vacuum insulation panel of claim 1, wherein the extended insulating portion is filled with insulation material with higher insulation performance than the sealing cover.

4. The vacuum insulation panel of claim 1, wherein the extended insulating portion is 0.1 to 0.3 mm thick.

5. An insulation structure of a refrigerator, comprising:
an exterior surface, formed of steel, of a refrigerator cabinet;
an interior surface, formed of plastic, of the refrigerator cabinet; and
a vacuum insulation panel disposed between the exterior and interior surfaces of the refrigerator cabinet, and provided with a core material, a sealing cover including a plurality of layers, an innermost layer being in contact with the core material, and having bonding portions, parts of the bonding portions bonded to each other so as to separate the core material from the outside, and an extended insulating portion formed by having a space between innermost layers of the sealing cover facing each other and disposed in unbonded parts of the bonding portions with a length long enough to cover a near corner of the vacuum insulation panel.

6. The insulation structure of a refrigerator of claim 5, wherein the extended insulating portion is filled with insulation material with higher insulation performance than the sealing cover.

7. The insulation structure of a refrigerator of claim 5, wherein the extended insulating portion is 0.1 to 0.3 mm thick.

* * * * *